United States Patent
Huh et al.

(10) Patent No.: US 10,988,046 B2
(45) Date of Patent: Apr. 27, 2021

(54) METHOD FOR SETTING ELECTRIC VEHICLE ON/OFF LINE OF HYBRID VEHICLE

(71) Applicants: Hyundai Motor Company, Seoul (KR); Kia Motors Corporation, Seoul (KR)

(72) Inventors: Jee-Wook Huh, Gyeonggi-do (KR); Seong-Ik Park, Seoul (KR); Chun-Hyuk Lee, Gyeonggi-do (KR); Kyoung-Cheol Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 551 days.

(21) Appl. No.: 15/838,872

(22) Filed: Dec. 12, 2017

(65) Prior Publication Data
US 2019/0106013 A1 Apr. 11, 2019

(30) Foreign Application Priority Data
Oct. 11, 2017 (KR) .................. 10-2017-0129975

(51) Int. Cl.
*B60L 58/12* (2019.01)
*B60W 10/06* (2006.01)
(Continued)

(52) U.S. Cl.
CPC ............ *B60L 58/12* (2019.02); *B60W 10/06* (2013.01); *B60W 10/08* (2013.01); *B60W 10/26* (2013.01); *B60W 20/13* (2016.01); *B60W 50/082* (2013.01)

(58) Field of Classification Search
CPC ....... B60L 58/12; B60W 20/13; B60W 10/06; B60W 10/08; B60W 10/26; B60W 50/082; B60W 50/08; B60W 2510/244; B60W 2520/10; B60W 2540/10; B60W 2552/15; B60W 30/18063; B60W 30/18072
See application file for complete search history.

(56) References Cited

U.S. PATENT DOCUMENTS 10,363,832 B2 * 7/2019 Nakagawa ............ B60L 53/122
10,406,887 B2 * 9/2019 Jeong .................... B60W 10/30
(Continued)

FOREIGN PATENT DOCUMENTS

| JP | 2011-073611 A | 4/2011 |
|---|---|---|
| JP | 5429400 B2 | 2/2014 |
| JP | 5767238 B2 | 8/2015 |

*Primary Examiner* — Angelina Shudy
(74) *Attorney, Agent, or Firm* — Mintz Levin Cohn Ferris Glovsky and Popeo, P.C.; Peter F. Corless (57) ABSTRACT

A method for setting an electric vehicle (EV) on/off line of a hybrid vehicle considers a driving load of the vehicle by setting the EV on/off line based on a climbing angle and creep power. The method for setting the EV on/off line of the hybrid vehicle includes an operation of setting a region according to a state of charge (SOC), an EV online setting operation based on a climbing angle of the vehicle, and an EV offline setting operation based on creep power of the vehicle. The method provides a simple and intuitive EV line setting method to reduce a mapping time and substantially eliminate the possibility of human error, thus increasing logic reliability, so as to reduce use of a hybrid control unit (HCU) memory and provide cost-saving effects.

10 Claims, 5 Drawing Sheets

(51) Int. Cl.
  *B60W 50/08*  (2020.01)
  *B60W 10/26*  (2006.01)
  *B60W 20/13*  (2016.01)
  *B60W 10/08*  (2006.01)

(56) References Cited

U.S. PATENT DOCUMENTS

| | | | |
|---|---|---|---|
| 10,464,546 B2* | 11/2019 | Kim | G07C 5/0808 |
| 2004/0050598 A1* | 3/2004 | Saito | B60L 15/2009 |
| | | | 180/65.225 |
| 2009/0093337 A1* | 4/2009 | Soliman | B60K 6/52 |
| | | | 477/5 |
| 2009/0240411 A1* | 9/2009 | Amamiya | B60W 30/18063 |
| | | | 701/70 |
| 2011/0166733 A1 | 7/2011 | Yu et al. | |
| 2012/0203407 A1* | 8/2012 | Hatanaka | B60L 15/2063 |
| | | | 701/22 |
| 2013/0204479 A1* | 8/2013 | Takamura | B60W 20/40 |
| | | | 701/22 |
| 2014/0335994 A1* | 11/2014 | Otake | B60W 30/181 |
| | | | 477/3 |
| 2015/0005998 A1* | 1/2015 | Choi | B60L 58/13 |
| | | | 701/22 |
| 2018/0222467 A1* | 8/2018 | Kaun | B60W 10/06 |
| 2018/0244262 A1* | 8/2018 | Ruybal | F02D 41/26 |
| 2018/0339697 A1* | 11/2018 | Ogawa | B60W 10/08 |
| 2019/0193715 A1* | 6/2019 | Lee | B60W 20/15 |
| 2019/0291714 A1* | 9/2019 | Kasahara | B60W 10/06 |
| 2019/0368459 A1* | 12/2019 | Huh | B60W 10/26 |
| 2020/0165987 A1* | 5/2020 | Cunningham | B60W 10/184 |
| 2020/0282971 A1* | 9/2020 | Bolthouse | B60W 20/40 |
| 2020/0324756 A1* | 10/2020 | Bolthouse | B60W 10/08 |
| 2020/0398844 A1* | 12/2020 | Ruybal | B60W 10/08 |

* cited by examiner

METHOD FOR SETTING ELECTRIC VEHICLE ON/OFF LINE OF HYBRID VEHICLE

CROSS-REFERENCE(S) TO RELATED APPLICATION

This application claims under 35 U.S.C. § 119(a) the benefit of Korean Patent Application No. 10-2017-0129975, filed on Oct. 11, 2017, the entire contents of which are incorporated herein by reference.

BACKGROUND

(a) Technical Field

Exemplary embodiments of the present disclosure relate to a method for setting an electric vehicle (EV) on/off line of a hybrid vehicle, and more particularly, to a method for setting an EV on/off line of a hybrid vehicle based on a driving load of the vehicle.

(b) Description of Related Art

A hybrid vehicle requires an efficient engine on/off control to increase fuel efficiency. During driving of the hybrid vehicle, an engine on state is referred to as a hybrid electric vehicle (HEV) mode, while an engine off state is referred to as an electric vehicle (EV) mode. That is, the HEV mode is a driving mode using both an engine and a motor, while the EV mode is a driving mode using only the motor.

A line for determining the engine on/off status is referred to as an EV line. Such an EV line includes an EV online for turning on an engine and an EV offline for turning off the engine, according to a driver's required power. The EV line is composed of a map that is determined by the driver's required power according to a State Of Charge (SOC) and a vehicle speed. A maximum size of a general map is 20×30, and a total number of maps amounts to 70, that is, 35 for each of the EV online and the EV offline.

Currently, the mapping of such an EV line is not automated according to a correlation between the map and each factor, but is manually performed by the experience of a person concerned in mapping. This manual mapping procedure has the following problems.

First, the mapping is manually performed without considering the correlation between the map and each factor, so that a mapping time is excessively required.

Second, there is a possibility of human error because the mapping is not automated. In particular, references for mapping may vary between different persons, and these references are not constant. Further, if a person lacks experience in mapping, the performance of a vehicle is not optimized. Further, since the map is vast, the EV line may be unintentionally operated by the mistake of a person concerned in mapping.

Third, a logic size is excessive because the correlation between the map and each factor is not considered. Thus, a large memory capacity of a Hybrid Control Unit (HCU) may be utilized, and additional cost may be required to increase the memory capacity of the HCU.

SUMMARY

An embodiment of the present disclosure is directed to a method for setting an EV (electric vehicle) on/off line of a hybrid vehicle considering a driving load of the vehicle by setting the EV on/off line based on a climbing angle and creep power.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a method for setting an electric vehicle (EV) on/off line of a hybrid vehicle including an operation of setting a region according to a state of charge (SOC); an EV online setting operation based on a climbing angle of the vehicle; and an EV offline setting operation based on creep power of the vehicle.

The operation of setting the region according to the SOC may set a whole region as 7 stages, including a critical low stage, a low stage, a normal low stage, a normal stage, a normal high stage, a high stage, and a critical high stage.

Each of the normal low stage and the normal high stage may be again subdivided into three stages.

The EV online setting operation may include an operation of calculating a climbing angle that allows driving only with an engine, a weight-factor determination operation, a normal EV online reference determination operation considering a weight factor, and an EV online determination operation according to a SOC region, the operations being sequentially performed.

The operation of calculating the climbing angle that allows driving only with the engine may sequentially perform determination of an engine optimal operating line according to an engine speed, determination of a number of speed-changing operation for a vehicle speed according to the engine optimal operating line, determination of engine power, determination of driving resistance, calculation of the climbing angle, and setting of reference driving power of a SOC normal region.

The EV offline setting operation may sequentially perform a creep-power determination operation, a critical low EV offline determination operation, and an operation of determining an EV offline for a SOC region.

The critical low EV offline determination operation may determine a critical low EV offline with a value obtained by adding a margin to the creep power determined at the creep-power determination operation.

In accordance with another embodiment of the present disclosure, a non-transitory computer readable medium containing program instructions executed by a processor includes: program instructions that set an electric vehicle (EV) on/off line of a hybrid vehicle, including: program instructions that set a region according to a state of charge (SOC); program instructions that perform an EV online setting operation based on a climbing angle of the vehicle; and program instructions that perform an EV offline setting operation based on creep power of the vehicle.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure will be described below in more detail with reference to the accompanying drawings so as to be easily realized by those skilled in the art. However, the detailed description of known functions and construction that may make the disclosure unclear will be omitted herein.

Figure 1:
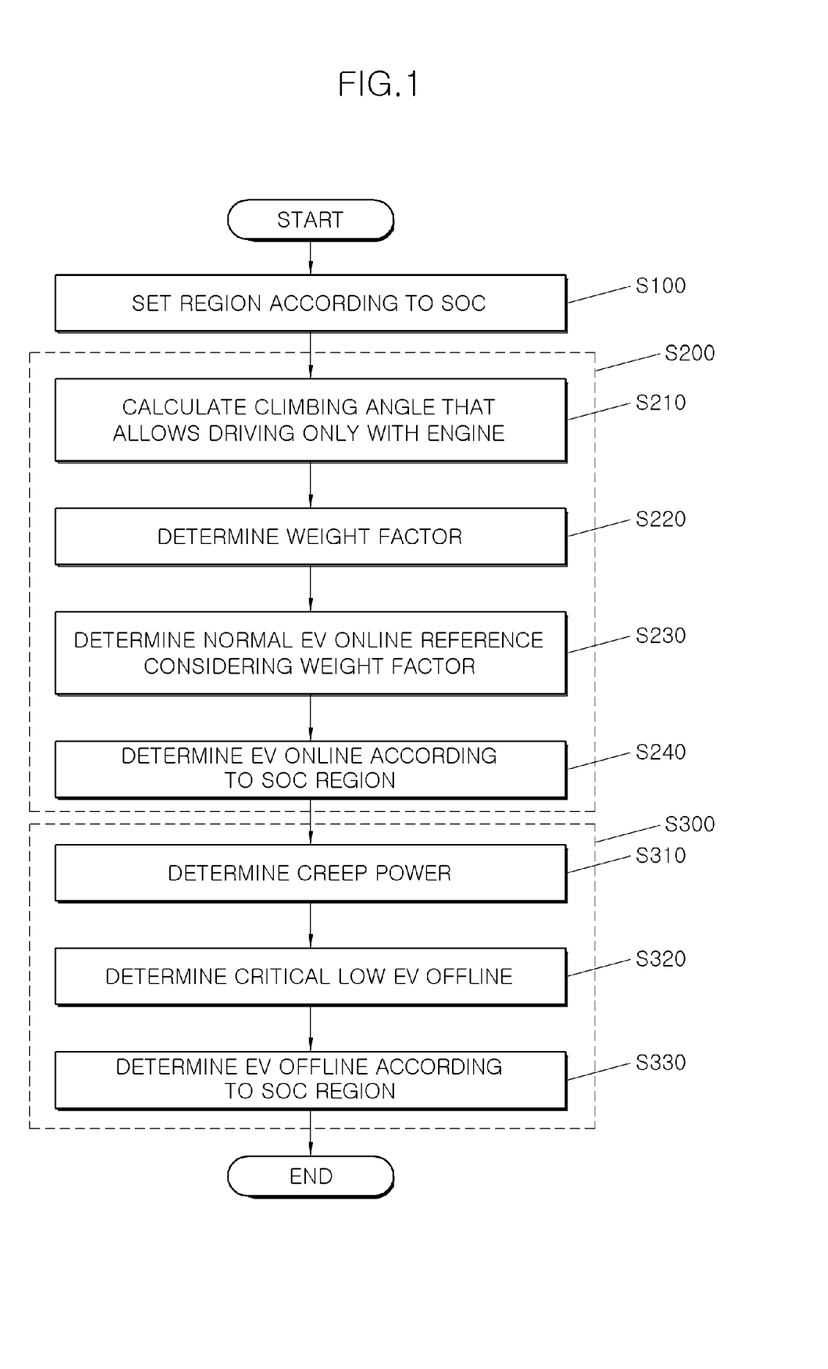
FIG. 1 is a flowchart illustrating a method for setting an EV on/off line of a hybrid vehicle according to the present disclosure.

FIG. 1 is a flowchart illustrating a method for setting an electric vehicle (EV) on/off line of a hybrid vehicle according to the present disclosure. Referring to FIG. 1, the method for setting the EV on/off line of the hybrid vehicle according to the present disclosure sequentially includes a step S100 of setting a region according to a state of charge (SOC), an EV online setting step S200, and an EV offline setting step S300.

1) Step of Setting a Region by SOC (S100)

At the step S100 of setting region according to the SOC, a whole region is set to seven (7) stages, including a critical low stage, a low stage, a normal low stage, a normal stage, a normal high stage, a high stage, and a critical high stage. Among them, each of the normal low stage and the normal high stage is again divided into three stages, including a normal low 1 stage, a normal low 2 stage, and a normal low 3 stage, and a normal high 1 stage, a normal high 2 stage, and a normal high 3 stage. Further, the SOC corresponding to each region is determined on the basis of the normal stage, as shown in the following Table 1.

TABLE 1

|  | CL | L | NL1 | NL2 | NL3 | N | NH1 | NH2 | NH3 | H | CH |
|---|---|---|---|---|---|---|---|---|---|---|---|
| ENTRY | 30 | 40 | 45 | 50 | 55 | REFERENCE | 60 | 65 | 70 | 80 | 90 |
| RELEASE | 32 | 42 | 47 | 52 | 57 |  | 58 | 63 | 68 | 78 | 88 |

* C: Critical, L: Low, N: Normal, H: High

2) EV Online Setting Step (S200)

Next, the EV online setting step S200 includes a step S210 of calculating a climbing angle that allows driving only with the engine, a weight-factor determination step S220, a normal EV online reference determination step S230 considering a weight factor, and an EV online determination step S240 according to a SOC region. These steps are sequentially performed.

In the method for setting the EV on/off line of the hybrid vehicle according to the present disclosure, the EV online turns on the engine when driving power exceeding the EV online is required during the EV driving. Here, the driving power is determined by an accelerator pedal or a cruise control.

The method for setting the EV on/off line of the hybrid vehicle according to the present disclosure sets a climbing angle as a reference of the EV online. For example, the driving power required when the vehicle climbs a gradient of 3% is approximately equal to the driving power required when the vehicle is accelerated at an acceleration of 0.3 g. Thus, a case where a driver maintains a constant speed or accelerates the vehicle at a constant acceleration on a predetermined gradient is set as the reference of the EV line.

① Step of Calculating Climbing Angle that Allows Driving Only with Engine (S210)

At the step S210 of calculating the climbing angle that allows driving only with the engine, first, an optimal operating line of the engine is determined. The EV line determines the optimal operating line (torque) of the engine for each engine speed so as to increase the efficiency of the engine by the control for the efficient engine on/off.

After the optimal operating line of the engine is determined, the number of speed-changing step is determined. The number of speed-changing step for each vehicle speed is determined from a shift map when the optimal operating line is driven at a required torque.

After the number of speed-changing step is determined, engine power is determined. The engine power is determined by the following equation from the optimal operating line of the engine and the engine speed.

engine power=engine optimal operating line×engine speed  [Equation 1]

After the determination of the engine power, driving resistance is determined. Here, the driving resistance determined for authentication is used. This is determined by the following equation from preset driving resistance coefficients $f_0$, $f_1$ and $f_2$.

driving resistance=$f_0+f_1 v+f_2 v^2$, where v represents a vehicle speed (km/h).  [Equation 2]

After the driving resistance is determined, the climbing angle that allows driving only with the engine is calculated by the following equation.

$$\text{climbing angle (\%)} = \frac{(\text{engine power} \times \text{transmission efficiency} \times \text{drivetrain loss} \times \frac{v}{3.6} - \text{driving resistance})}{g \times m} \times 100 \quad [\text{Equation 3}]$$

Here, g represents gravitational acceleration (m/s$^2$), m represents a weight (kg), and v represents vehicle speed (km/h).

Figure 2:
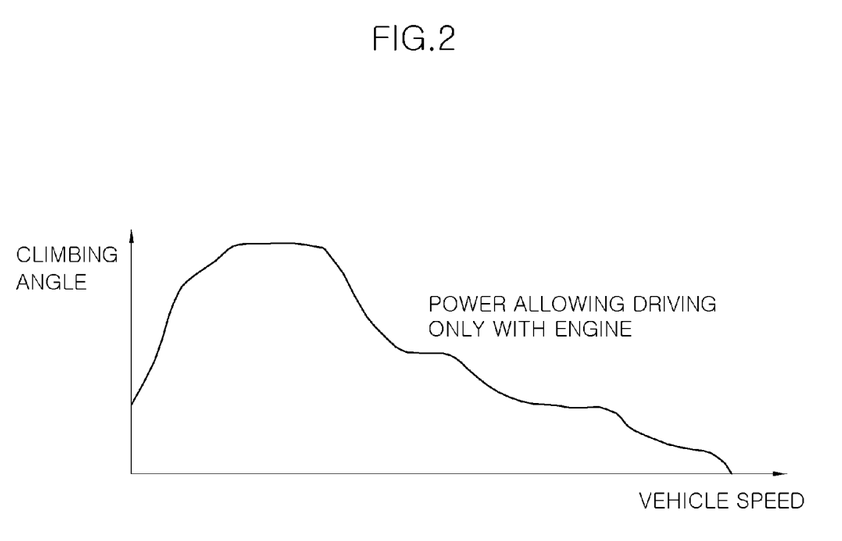
FIG. 2 is a graph illustrating the setting of reference driving power of a SOC normal region with climbing power that allows driving only with an engine at an EV online setting step of the present disclosure.

After the climbing angle is calculated, as a final operation of the step S210 of calculating the climbing angle that allows driving only with the engine, a reference driving power of the SOC normal region is set as climbing power that allows driving only with the engine, as illustrated in FIG. 2.

② Weight-Factor Determination Step (S220)

At the weight-factor determination step S220, the weight factor $F_m$ is calculated by the following equation.

$$F_m = 1 + \frac{(\text{reference weight} - \text{weight})}{\text{reference weight}} \times \alpha \quad [\text{Equation 4}]$$

In the above equation, the weight uses a value according to the specification of a target vehicle, and the reference weight is 1600 kg. Further, a uses 0.8 as the weight factor coefficient. The respective values may be changed by an inventor.

The reason why the weight factor is needed is as follows. As the weight increases, the causes of decreasing the SOC increase. Thus, when the operating quantity of the engine is relatively high, it is possible to maintain the SOC. Consequently, a weight that is equal to or more than a physically calculated value is applied as the factor to actively cope with the SOC.

③ Step of Determining Normal EV Online Reference Considering Weight Factor (S230)

Figure 3:
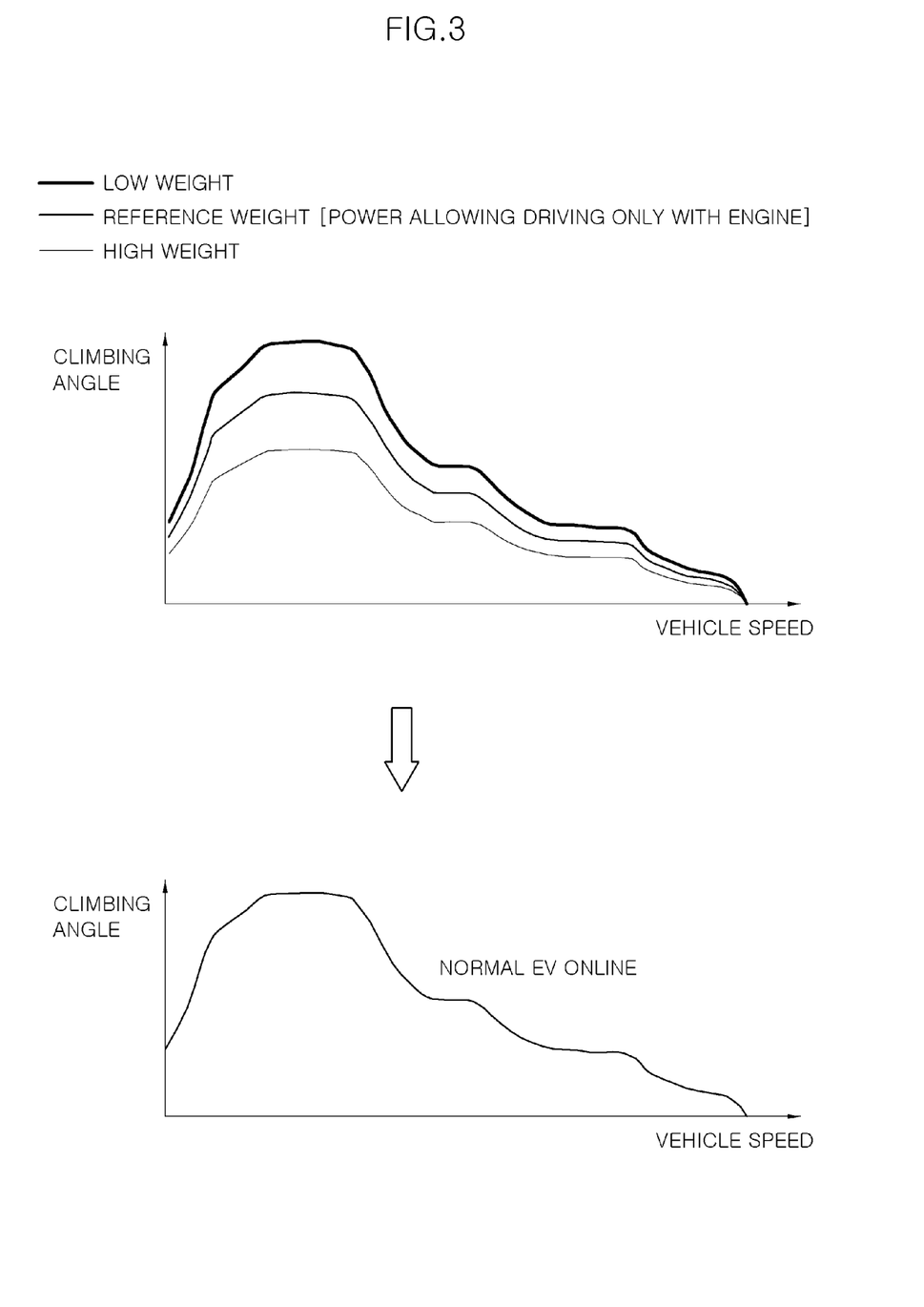
FIG. 3 is a graph illustrating the determination of a normal EV online reference considering a weight factor at the EV online setting step of the present disclosure.

At the step S230 of determining the normal EV online reference considering the weight factor, the reference of the EV line is determined as illustrated in FIG. 3, considering the climbing power allowing driving only with the engine, which is calculated at the step S210 of calculating the climbing angle that allows driving only with the engine, and the weight factor determined at the weight-factor determination step S220. This reference is set as the normal EV online.

④ EV Online Determination Step for SOC Region (S240)

At the EV online determination step S240 for the SOC region, the EV online is determined according to the factor set for the SOC region, as illustrated in the following table, based on the normal EV online that is set at the step S230 of determining the normal EV online reference considering the weight factor.

TABLE 2

| Ex. | CL | L | NL1 | NL2 | NL3 | N | NH1 | NH2 | NH3 | H | CH |
|---|---|---|---|---|---|---|---|---|---|---|---|
| Factor | 0.5 | 0.8 | 0.9 | 0.96 | 0.98 | 1 | 1.02 | 1.04 | 1.1 | 1.2 | 1.5 |

3) EV Offline Setting Step (S300)

Next, the EV offline setting step S300 includes a creep-power determination step S310, a critical low EV offline determination step S320, and an EV offline determination step S330 for an SOC region. These steps are sequentially performed.

In the method for setting the EV on/off line of the hybrid vehicle according to the present disclosure, the EV offline turns off the engine when the driving power that is equal to or less than the EV offline is required during the HEV driving. Here, the driving power is determined by the accelerator pedal or the cruise control.

The method for setting the EV on/off line of the hybrid vehicle according to the present disclosure sets creep power as the reference of the EV offline. The creep power is power for creating a deceleration feel of the vehicle when a driver does not press the accelerator pedal or a brake pedal. This prevents a problem where the engine is not turned off even when a driver takes his or her foot off the accelerator pedal, if the EV offline is smaller than the creep power.

① Creep-Power Determination Step (S310)

Figure 4:
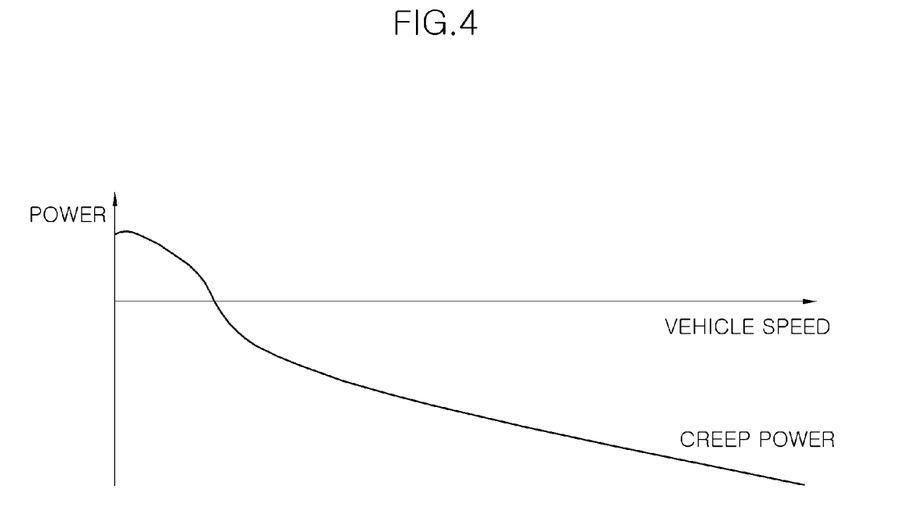
FIG. 4 is a graph illustrating the mapping of creep power considering drivability at an EV offline setting step of the present disclosure.

At the creep-power determination step S310, the creep power is mapped in consideration of drivability, as illustrated in FIG. 4.

② Critical Low EV Offline Determination Step (S320)

Figure 5:
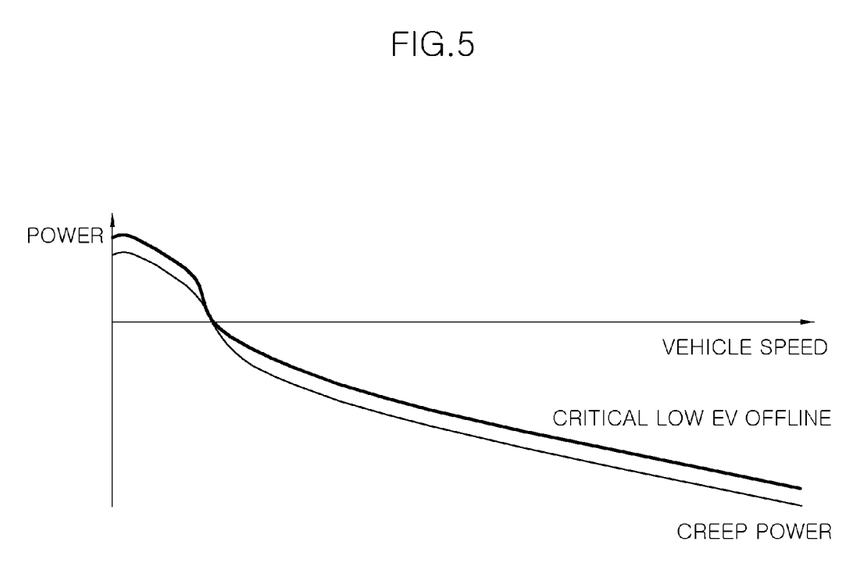
FIG. 5 is a graph illustrating the determination of a critical low EV offline with a value obtained by adding a margin to creep power at the EV offline setting step of the present disclosure.

At the critical low EV offline determination step S320, the critical low EV offline is determined with a value obtained by adding a margin 13 to the creep power determined at the creep-power determination step S310, as illustrated in FIG. 5.

③ Step of Determining EV Offline for SOC Region (S330)

At the step S330 of determining the EV offline for the SOC region, the EV offline for the SOC region is determined according to the set factor, as illustrated in the following table, based on the critical low EV offline that is determined at the step S320 of determining the critical low EV offline. Here, a minimum value (Min) is established to transfer a negative region of the offline to a positive region.

TABLE 3

| Ex. | | CL | L | NL1 | NL2 | NL3 | N | NH1 | NH2 | NH3 | H | CH |
|---|---|---|---|---|---|---|---|---|---|---|---|---|
| Fac-tor | +REGION | 1 | 1 | 1.3 | 1.3 | 1.3 | 1.4 | 1.5 | 1.5 | 1.5 | 2 | 2 |
| | −REGION | 1 | 1 | 0.7 | 0.7 | 0.7 | 0.6 | 0.5 | 0.5 | 0.5 | 0.1 | 0.1 |
| | Min[kW] | — | — | 0 | 0 | 0 | 3 | 5 | 5 | 5 | 10 | 20 |

As described above, the method for setting the EV on/off line of the hybrid vehicle according to the present disclosure is capable of reducing a mapping time and guaranteeing consistency, minimizing the human error and thereby guaranteeing logic stability, and saving a cost required to increase the memory capacity of the HCU.

While the present disclosure has been described with respect to the specific embodiments, it will be apparent to those skilled in the art that various changes and modifications may be made without departing from the spirit and scope of the disclosure as defined in the following claims.

For example, when the reference driving power of the SOC normal region is set at the EV online setting step S200, the calculated climbing angle may be strategically adjusted, or the acceleration may be used instead of the climbing angle. Further, the weight factor may not be used, or the adjustment may be set not by the factor but by an absolute value. Furthermore, the SOC region may not be divided, may be subdivided or simplified.

At the EV offline setting step S300, zero torque may be used instead of creep torque, and the adjustment may be set not by the factor but by an absolute value.

A method for setting an EV on/off line of a hybrid vehicle considering a driving load of the vehicle according to the present disclosure provides a simple and intuitive EV line setting method to considerably save mapping time and dramatically reduce the possibility of human error, thus increasing logic reliability, saving a HCU memory and consequently attaining cost-saving effects.

What is claimed is:

1. A method for setting an electric vehicle (EV) on/off line of a hybrid vehicle comprising:
    performing, by a controller, an operation of setting a region according to a state of charge (SOC);
    performing, by the controller, an EV online setting operation based on a climbing angle of the vehicle; and
    performing, by the controller, an EV offline setting operation based on creep power of the vehicle,
    wherein the EV online setting operation turns on an engine of the vehicle when driving power exceeding an EV online is required while the hybrid vehicle drives in an EV driving mode and the EV offline setting operation turns off the engine when the driving power that is equal to or less than an EV offline is required while the hybrid vehicle drives in an HEV driving mode,
    wherein the EV offline setting operation sequentially performs a creep-power determination operation, a critical low EV offline determination operation, and an operation of determining an EV offline for an SOC region determined according to the predetermined factor based on the critical low EV offline, and
    wherein the critical low EV offline determination operation determines a critical low EV offline a value obtained by adding margin to the creep power determined at the creep-power determination operation.

2. The method of claim 1, wherein the operation of setting the region according to the SOC sets a whole region as seven stages, including a critical low stage, a low stage, a normal low stage, a normal stage, a normal high stage, a high stage, and a critical high stage in order of level of the SOC.

3. The method of claim 2, wherein each of the normal low stage and the normal high stage is again subdivided into three stages.

4. The method of claim 1, wherein the EV online setting operation comprises an operation of calculating a climbing angle that allows driving only with an engine, a weight-factor determination operation, a normal EV online reference determination operation considering a weight factor, and an EV online determination operation according to a SOC region, the operations being sequentially performed.

5. The method of claim 4, wherein the step of calculating the climbing angle that allows driving only with the engine sequentially performs determination of an engine optimal operating line according to an engine speed, determination of a number of speed-changing operation for a vehicle speed according to the engine optimal operating line, determination of engine power, determination of driving resistance, calculation of the climbing angle, and setting of reference driving power of a SOC normal region.

6. The method of claim 5, wherein the engine power is determined by the following equation:

engine power=engine optimal operating line×engine speed.

7. The method of claim 5, wherein the driving resistance is determined by the following equation:

driving resistance=$f_0 + f_1 v + f_2 v^2$ where $f_0$, $f_1$ and $f_2$ represent driving resistance coefficients, and v represents a vehicle speed (km/h).

8. The method of claim 5, wherein the climbing angle is determined by the following equation:

$$\text{climbing angle (\%)} = \frac{(\text{engine power} \times \text{transmission efficiency} \times \text{drivetrain loss} \times \frac{v}{3.6} - \text{driving resistance})}{g \times m} \times 100$$

where g represents gravitational acceleration (m/s$^2$), m represents a weight (kg), and v represents a vehicle speed (km/h).

9. The method of claim 4, wherein, at the weight-factor determination operation, the weight factor ($F_m$) is determined by the following equation:

$$F_m = 1 + \frac{(\text{reference weight} - \text{weight})}{\text{reference weight}} \times \alpha$$

where α represents a weight-factor coefficient.

10. A non-transitory computer readable medium containing program instructions executed by a processor, the computer readable medium comprising:

program instructions that set an electric vehicle (EV) on/off line of a hybrid vehicle, comprising:
program instructions that set a region according to a state of charge (SOC);
program instructions that perform an EV online setting operation based on a climbing angle of the vehicle; and
program instructions that perform an EV offline setting operation based on creep power of the vehicle,
wherein the EV offline setting operation sequentially performs a creep-power determination operation, a critical low EV offline determination operation, and an operation of determination offline for an SOC region determined according to the predetermined factor based on the critical low EV offline, and
wherein the critical low EV offline determination operation determines a critical low EV offline with a value obtained by adding a margin to the creep power determined at the creep-power determination operation.

* * * * *